INVENTORS
MIYAJI TOMOTA
HIROO YAMASAKI
YOSHIO KURITA

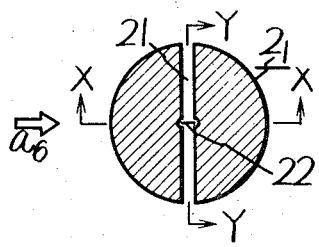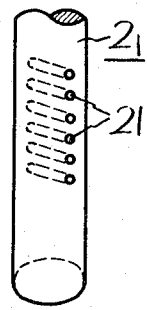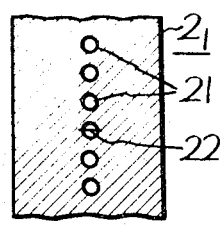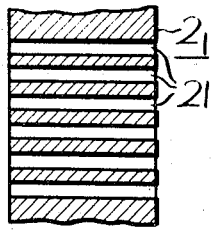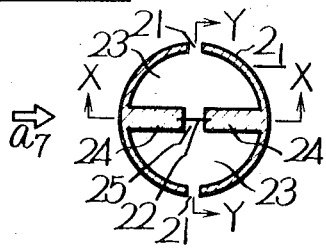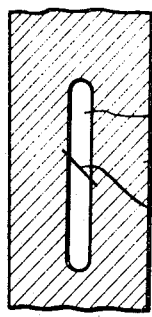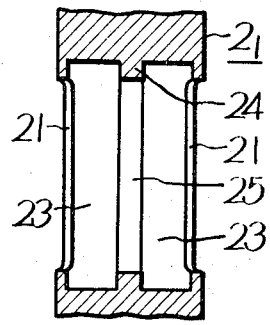

Feb. 23, 1971   MIYAJI TOMOTA ET AL   3,564,915
CURRENT METER OR FLOW METER
Filed Sept. 18, 1968   12 Sheets-Sheet 7

INVENTORS
MIYAJI TOMOTA
HIROO YAMASAKI
YOSHIO KURITA
BY ATTORNEYS

Feb. 23, 1971  MIYAJI TOMOTA ET AL  3,564,915
CURRENT METER OR FLOW METER
Filed Sept. 18, 1968  12 Sheets-Sheet 10

INVENTORS
MIYAJI TOMOTA
HIROO YAMASAKI
YOSHIO KURITA
ATTORNEYS

Feb. 23, 1971 MIYAJI TOMOTA ET AL 3,564,915
CURRENT METER OR FLOW METER
Filed Sept. 18, 1968 12 Sheets-Sheet 11

INVENTORS
MIYAJI TOMOTA
HIROO YAMASAKI
YOSHIO KURITA
ATTORNEYS

United States Patent Office 3,564,915
Patented Feb. 23, 1971

3,564,915
CURRENT METER OR FLOW METER
Miyaji Tomota, Hiroo Yamasaki, and Yoshio Kurita, Tokyo, Japan, assignors to Kabushikikaisha Yokogawa Denki Seisakusho (Yokogawa Electric Works, Ltd.), Tokyo, Japan, a corporation of Japan
Filed Sept. 18, 1968, Ser. No. 760,604
Claims priority, application Japan, Sept. 27, 1967, 42/62,134
Int. Cl. G01f 1/00
U.S. Cl. 73—194                     23 Claims

ABSTRACT OF THE DISCLOSURE

A current meter or flow meter having a rod-shaped member having bored therethrough a transverse bore for producing the Karman vortices when immersed in a fluid stream, the ports of the transverse bore opening out in the vicinity of the separation point of the boundary layers of the fluid from the rod-shaped member, and a sensing element disposed in the transverse bore for detecting the number of displacements of the fluid flowing through the transverse bore.

BACKGROUND OF THE INVENTION

Field of the invention

This invention relates to a current meter or flow meter utilizing the Karman vortex street, and more particularly to a current meter or flow meter which is designed such that a cylindrical object is immersed in a fluid stream for producing the Karman vortex street and the number of the vortices formed or the corresponding fluid variation is detected by detector means incorporated in the cylindrical object.

Description of the prior art

When a fluid F flows by a cylindrical object 2 immersed in the fluid stream the boundary layers of the fluid on the cylindrical object 2 are separated from its surface to alternately and periodically produce vortices 1 on opposite sides of the cylindrical object with respect to the fluid flow direction and the vortices 1 thus formed are swept down the stream in line as shown in FIG. 1, which is commonly referred to as the Karman vortex street in the art and is a phenomenon which has long been watched.

If the number of the vortices produced is taken as $f$, the diameter of the cylindrical object 2 is taken as $D$ and the flow velocity of the fluid is taken as $v$, their relationship is given by the following equation:

$$f = K \cdot \frac{v}{D} \quad (K: \text{constant}) \quad (1)$$

Based upon the fact that the number $f$ of the Karman vortices produced is closely related to the fluid flow velocity or flow rate as mentioned in the above Equation 1, in conventional types of current or flow meters a detecting element for detecting the vortices is immersed in the fluid stream down the cylindrical object to thereby measure the fluid flow velocity or flow rate.

However, from an observation of the formation of the Karman vortices by a cylindrical object immersed in a fluid flowing through a pipe or the like as in the conventional instruments, it has been found that the conditions of the separation of the fluid from the cylindrical object are not constant, for example, due to nonuniformity of the flow velocity distribution of the fluid in the pipe and that the formation of the Karman vortices is rendered unstable by fluid fluctuations and eddies other than the Karman vortices, thus making it difficult to satisfy the relation given by the aforementioned Equation 1 in practice. Consequently, the prior art instruments encounter a difficulty in accurate measurement of the fluid flow velocity or flow rate.

SUMMARY OF THE INVENTION

One object of this invention is to provide an instrument which facilitates stable formation of the Karman vortices by a cylindrical object immersed in a fluid stream irrespective of the fluctuation of the fluid or eddies other than the Karman vortices so as to ensure accurate and stable measurement of the fluid flow velocity or flow rate.

Another object of this invention is to provide a current or flow meter which is adapted such that the Karman vortices are stably produced by a cylindrical object immersed in a fluid stream in the axial direction of the cylindrical object irrespective of the fluctuation and eddies other than the Karman vortices in the fluid stream so as to eliminate the influence of fluid noise contained in the fluid.

Still another object of this invention is to provide a current or flow meter which is simple in construction and is stable and free from the influence of characteristic changes of a sensing element of a detecting unit provided in a cylindrical object.

Other objects, features and advantages of this invention will become apparent from the following description taken in conjunction with the accompanying drawings.

BRIEF DESCRIPTION OF THE DRAWING

FIGS. 8 to 17, inclusive, are schematic diagrams illustrating other examples of the cylindrical object of this invention;

DESCRIPTION OF THE PREFERRED EMBODIMENTS

Figure 1:
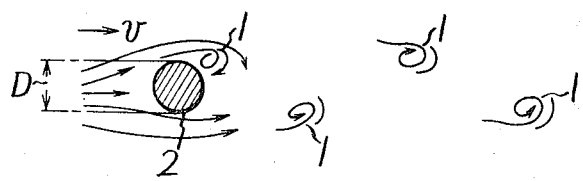
FIG. 1 is a schematic diagram for purposes of explanation of the Karman vortex street.
Figure 2:
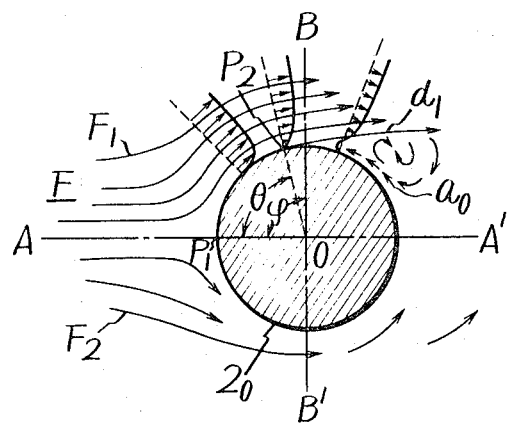
FIG. 2 is a diagrammatic representation of the flow condition of a fluid in the vicinity of a cylindrical object immersed therein.

When a cylindrical object $2_0$ is immersed in a fluid stream, the fluid flow in the vicinity of the cylindrical object $2_0$ usually becomes as shown in FIG. 2. Namely, a fluid F striking against the cylindrical object $2_0$ breaks into two streams $F_1$ and $F_2$ at a stagnation point $P_1$ and the two streams flow along the surface of the cylindrical object $2_0$ on opposite sides. The fluid flow velocity on the surface of the cylindrical object $2_0$ gradually increases as the fluid stream goes away from the stagnation point $P_1$, while its fluid pressure gradually decreases. The flow velocity on the surface of the cylindrical object $2_0$ reaches a maximum value in the vicinity of a point $P_2$ on the surface of the cylindrical object $2_0$ and thereafter gradually decreases. While, the pressure of the fluid increases as it goes away from the point $P_2$ and the pressure rise causes the fluid stream to lose its kinetic energy and finally rest. When the fluid stream has stopped the fluid is swept away to a fluid portion of low pressure and collides with the following fluid portion, so that the fluid (boundary layer) starts to come away from the surface of the cylindrical object $2_0$ near the point $P_2$ shown in FIG. 2. At the same time, a contraflow is yielded down the point $P_2$ as indicated by an arrow $a_0$, providing a discontinuity surface $d_1$ between the contraflow and the fluid stream having separated from the surface of the cylindrical object $2_0$. The discontinuity surface $d_1$ gradually grows into a vortex and goes away from the cylindrical object $2_0$, and the resulting vortex is swept away downstream. In this manner, the so-called Karman vortex street is produced. The point $P_2$ where the aforementioned boundary layer of the fluid separates from the cylindrical object $2_0$ varies relatively with the presence, conditions and strength of the vortices in the downstream.

Figure 3:
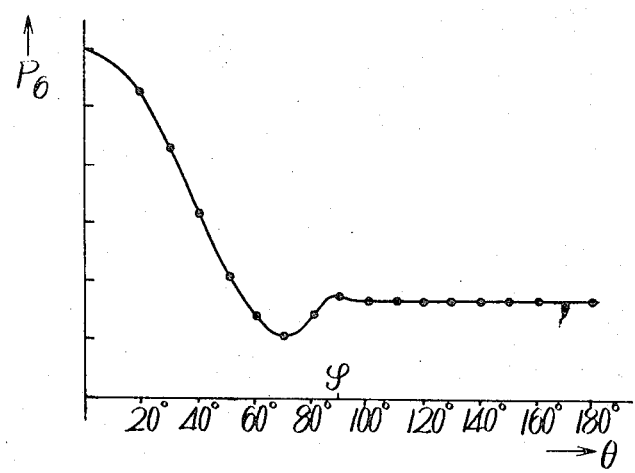
FIG. 3 is a graphical representation of the distribution of the surface pressure of the cylindrical object immersed in the fluid stream.

In FIG. 3 there is plotted the mean value in time of the fluid pressure on the surface of the cylindrical object $2_0$, the abscissa representing an angle $\theta$ (in degree) in a direction $OP_2$ relative to a straight line OA and the ordinate the fluid pressure $Po$ applied to the surface of the cylindrical object $2_0$. That is, it has been ascertained that the pressure becomes minimum in the range of $\theta$ being 60° to 90° in a direction A–A' of the fluid stream on opposite sides thereof. Further, it has also been found that the inflection point of the pressure distribution characteristic curve (corresponding to the point $P_2$) varies in a range from about 65° to 110° centering on $\theta \doteq 80°$ and that the inflection point periodically varies under the influence of the formation, growth and separation of the vortices.

Figure 4:
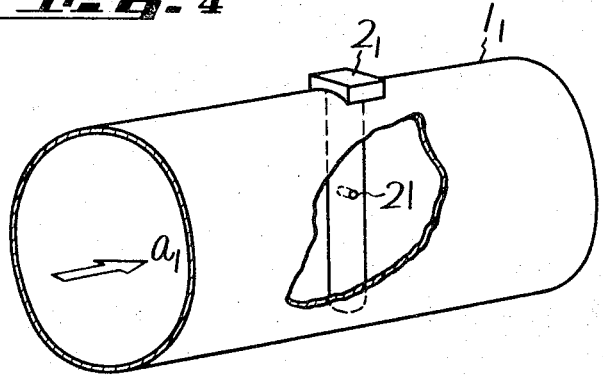
FIG. 4 is a perspective view, partly cut away, illustrating one example of the cylindrical object for producing the Karman vortex street and a pipe supporting the cylindrical object according to this invention.
Figure 5:
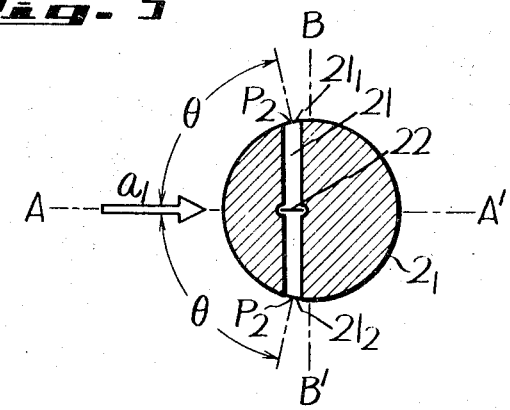
FIG. 5 is a cross-sectional view of the principal part of the cylindrical object depicted in FIG. 4.

In FIGS. 4 and 5 illustrating, by way of example, the construction of the cylindrical object produced according to this invention, reference numeral $1_1$ indicates a pipe formed of, for example, iron or the like in which a fluid flows in a direction of an arrow $a_1$ and $2_1$ the cylindrical object which is formed of a corrosion-proof material such, for example, as brass or the like and is positioned in the pipe $1_1$ in a manner to lie across the fluid stream substantially at right angles to the fluid flow direction $a_1$. The cylindrical object $2_1$ has formed therethrough a transverse bore 21 approximately perpendicular to the fluid flow direction A–A' (indicated by $a_1$) and to the lengthwise direction of the cylindrical object $2_1$, as depicted in FIG. 5. The fluid flowing around the cylindrical object $2_1$ can pass through the bore 21. The openings $21_1$ and $21_2$ of the bore 21 on the surface of the cylindrical object $2_1$ on the opposite sides of the line A–A' are each located at a position substantially corresponding to the vicinity of the center ($\theta=65°$ to 110°) of the shift of the aforementioned point $P_2$ where the boundary layer of the fluid comes off from the surface of the cylindrical object $2_1$. Inside of the bore 21 there is disposed a sensing element 22 such as, for example, a platinum wire or a tungsten wire (a hot wire) for detecting the displacement or flow velocity of the fluid flowing through the bore 21. The bore 21, the sensing element 22 and so on constitute a detecting unit.

A description will hereinbelow be given in connection with the manner of the formation, growth and separation of the vortices in a fluid in the case of using the cylindrical object constructed as above described.

Figure 6A:
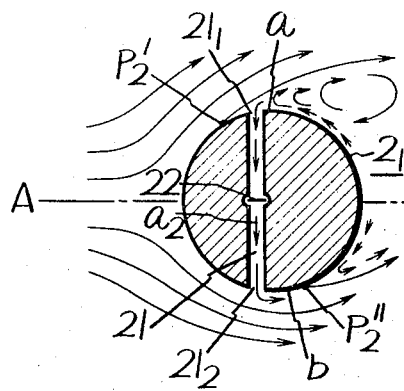
FIGS. 6A and 6B are schematic diagrams showing the flowing conditions of the fluid in the vicinity of the cylindrical objects immersed in the fluid stream for purposes of explanation of the function of the cylindrical objects.
Figure 6B:
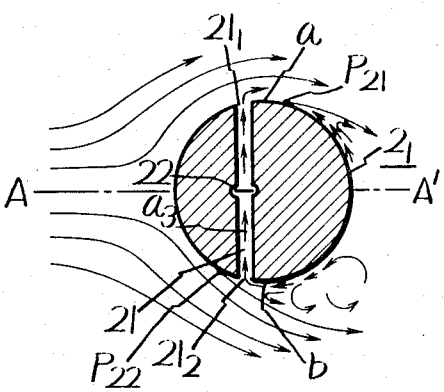

The point $P_2$ where the boundary layer of the fluid comes off from the surface of the cylindrical object $2_1$ is caused to move on the surface of the cylindrical object $2_1$ under the mutual influence of the presence, condition and vorticity of the Karman vortex street in the downstream as previously mentioned. Assuming that a vortex on the underside $b$ of the cylindrical object $2_1$ has just separated therefrom, that is, the vortex is still undeveloped and smaller than that on the upper-side $a$ of the cylindrical object $2_1$ and that the vortices have come off from the surface of the cylindrical object $2_1$ at points $P_2'$ (on the upper-side $a$) and $P_2''$ (on the underside $b$) as shown in FIG. 6A, the fluid in the bore 21 is displaced or flows in a direction indicated by an arrow $a_2$ because the fluid pressure at the opening $21_1$ of the bore 21 on the upper-side $a$ is higher than that at the opening $21_2$ on the underside $b$. Upon displacement of the fluid within the bore 21 in the direction of the arrow $a_2$, one portion of the fluid outside of the bore 21 is sucked thereinto from its opening $21_1$ on the side $a$ and flows out from the opening $21_2$ on the side $b$. Now, let it be assumed that a vortex on the side $a$ has just separated from the cylindrical object $2_1$ and that the separation points $P_{21}$ and $P_{22}$ of the boundary layers of the fluid on the opposite sides of the cylindrical object $2_1$ are opposite in position to those in FIG. 6A relative to the bore 21 as illustrated in FIG. 6B. In such a case the pressures of the fluid at the openings $21_1$ and $21_2$ of the bore 21 on the both sides $a$ and $b$ are opposite to those in FIG. 6A. Consequently, the fluid in the bore 21 is displaced in a direction of an arrow $a_3$ opposite to that in FIG. 6A and one portion of the fluid outside the bore 21 is sucked thereinto from the opening on the side $b$ to flow in the direction of the arrow $a_3$ and out from the other opening $21_1$ on the side $a$.

It is generally known in the art that when the boundary layer of a fluid flowing on the curved surface of an object is in a condition to readily separate from the surface of the object, the stream flowing out from the opening of the bore of the object near the separation point facilitates the separation of the fluid and that the suction of one portion of the fluid into the bore serves to delay the separation of the fluid from the curved surface of the object. Especially, the suction of the stream having lost its kinetic energy and having its boundary layer being on the point of separating from the curved surface has a marked effect on the suppression of the separation of the fluid.

The displacement or flow of the fluid in the bore 21 resulting from alternate generation and shedding of the vortices from the opposite sides $a$ and $b$ of the cylindrical object $2_1$ causes alternate suction and shedding of the fluid at the opposite openings $21_1$ and $21_2$ as described above. The conditions for the formation of the vortices on the opposite sides of the cylindrical object are controlled by the fluid stream caused by the suction and shedding of the fluid into and out of the bore 21, so that the formation of the vortices is effected stably irrespective of vortices other than the Karman vortex street, the fluid stream and variations in the flow velocity or turbulence thereof. Further, the shedding of the vortices from the cylindrical object down it is achieved regularly and stably in accordance with the arrangement principle of the Karman vortex street and the fluid flow velocity, and the period of the displacement or the flow of the fluid in the bore 21, which is closely related to the Karman vortices, is also stable and is accurately in proportion to the number of the vortices produced. Consequently, it is possible to detect from the sensing element disposed in the bore 21 a signal accurately in proportion to the period of the displacement or flow of the fluid through the bore 21.

Figure 7A:
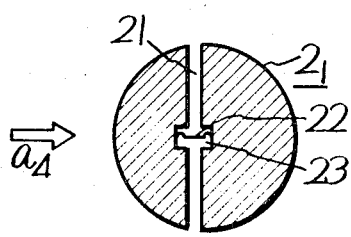
FIGS. 7A and 7B are respectively cross-sectional views of the principal part of other examples of the cylindrical object of this invention.
Figure 7B:
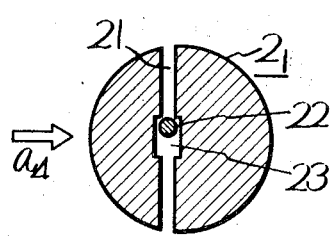
Figure 8A:
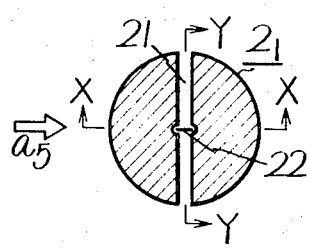
Figure 8D:
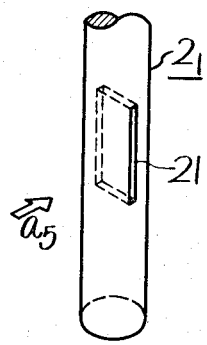
Figure 8B:
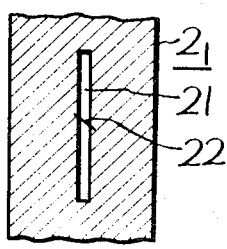
Figure 8C:
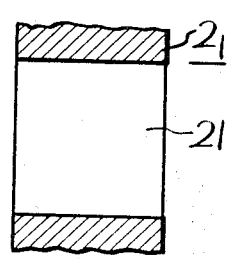

Although the sensing element 22 is shown in the form of a hot wire in FIG. 6, it may be modified as illustrated in FIG. 7. In FIG. 7A there is provided in the bore 21 of the cylindrical object $2_1$ substantially at the center thereof a ring-shaped cavity 23 of a diameter larger than that of the bore 21, in which cavity a diaphragm formed of, for example, stainless steel of excellent corrosion resistance is positioned as a sensing element 22 substantially at right angles to the flow direction of the fluid stream in the bore 21. In such a case the diaphragm 22 is displaced in accordance with the fluid flowing in the bore 21, namely the fluid in the bore 21 is caused to alternately flow thereinto or out thereof from either opening of the bore 21 in accordance with the displacements of the diaphragm 22. FIG. 7B shows another modified form of the sensing element 22, in which case the cavity 23 depicted in FIG. 7A is extended a little in the lengthwise direction of the bore 21 and a ball formed of, for example, a metal difficult to be corroded by the fluid is loosely fitted in the cavity 23 as a sensing element 22, and the displacement of the ball corresponding to that of the fluid stream in the bore 21 is detected electromagnetically or optically.

FIGS. 8 to 17, inclusive, are diagrammatic representations of other embodiments of this invention, in which similar elements to those in FIGS. 4 to 7 are identified by the similar reference numerals.

In the example shown in FIG. 8 the transverse bore 21 of the cylindrical object $2_1$ is provided in the form of a slit with its inlet or outlet ports opening out in the axial direction of the cylindrical object $2_1$ and the central angle $\theta$ relative to the fluid flow direction is selected to be approximately 90 degrees relative to the central line of the fluid flow direction (indicated by an arrow $a_5$ in the figure) in the bore 21, and the other construction is substantially the same as in the foregoing examples.

In FIG. 9 the transverse bore is in the form of a plurality of bores 21 formed in the cylindrical object $2_1$ in such a manner that their inlet or outlet ports open out in line in the axial direction of the object $2_1$, namely the bores lie in parallel with one another and perpendicular to the axial direction of the cylindrical object $2_1$, and the sensing element 22 is disposed in one of the plurality of bores (six bores in the figure) for detecting the displacements of the fluid flowing through the bore. In the case where the bore 21 is provided in the form of a slit with its inlet or outlet ports extending in the axial direction of the cylindrical object $2_1$ or the plurality of bores 21 are provided to open in the axial direction of the cylindrical object $2_1$, shedding and suction of the fluid are alternately achieved in the neighborhood of the openings of the bores uniformly in the axial direction of the cylindrical object, by which the conditions for the shedding of the vortices from the opposite sides of the cylindrical object are rendered uniform also in the axial direction thereof. Consequently, when the cylindrical object is arranged in the pipe in such a condition as depicted in FIG. 4 and a fluid flows in the directions indicated by the arrows $a_5$ and $a_6$, the formation, growth and separation of vortices are synchronized in the direction of the cylinder axis and are effected more periodically and stably in accordance with the theory of the configuration of the Karman vortex street substantially irrespective of some turbulence of the flow velocity distribution or some fluctuation of the fluid flow velocity in the axial direction of the cylindrical object, as given by the Equation 1.

As mentioned previously, the formation, growth and separation of the Karman vortices produced periodically and stably also in the axial direction of the cylindrical object $2_1$ ensure periodic and stable change of the fluid flow direction in slit-shaped bore or the plurality of bores which bears a close relationship to the formation, growth and separation of the vortices. Therefore, it is possible to detect an output signal from the sensing element located in the bore 21 accurately in proportion to the number of the displacement or flow of the fluid passing through the bore 21, that is, the number of the vortices produced.

In FIG. 10 the bore 21 is provided in the cylindrical object $2_1$ in the form of a slit such that its inlet or outlet ports open out on the opposite sides of the cylindrical object $2_1$ in the axial direction thereof. A cavity 23 is formed in the cylindrical object $2_1$ which is contiguous to the slit-shaped inlet or outlet ports and in which a partition wall 24 is provided substantially at the center, and a slit 25 is bored through the partition wall 24 substantially at the center thereof at a place corresponding to the position of the slit-shaped inlet or outlet ports of the bore 21 and in addition the sensing element 22 is positioned in the slit 25 substantially at the center thereof. The present example is characterized in that the slitlike bore 21 passes through the cavity 23 and the slit 25 formed in the partition wall 24.

With such an arrangement, the fluid is displaced through the slitlike bore 21, the cavity 23 and the slit 25 formed in the partition wall 24, and shedding and suction of the fluid are alternately effected on the opposite sides of the cylindrical object $2_1$ in its axial direction. Consequently, the conditions for the separation of the vortices on the opposite sides of the cylindrical object $2_1$ are rendered uniform in the axial direction thereof.

Figure 11:
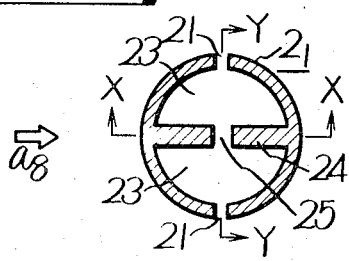
Figure 11:
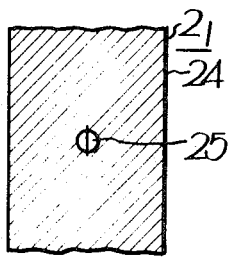
Figure 11:
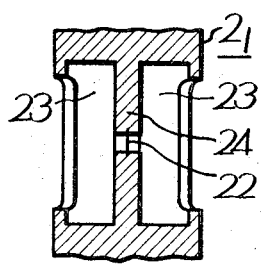

The example shown in FIG. 11 is the same in the provision of the bore 21, the cavity 23 and the partition wall 24 as in FIG. 10 except in that a round hole 25 is made in the partition wall 24 substantially at the center thereof, and the sensing element 22 is disposed in the hole $2_5$.

Figure 12:
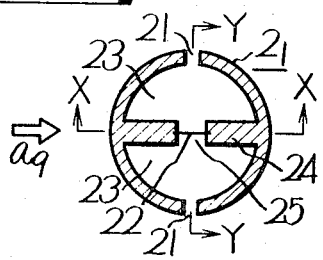
Figure 12:
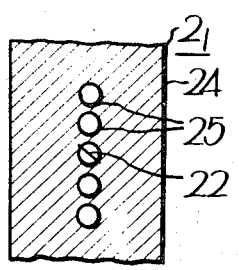
Figure 12:
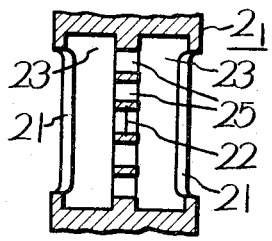

In the example depicted in FIG. 12 the bore 21, the cavity 23 and the partition wall 24 are similarly formed in the cylindrical object $2_1$ but a plurality of holes 25 of the same shape as that in FIG. 11 are made in the partition wall 24 substantially at the center thereof while being arranged in the axial direction of the cylindrical object $2_1$, and the sensing element 22 is placed in any one of the holes 25.

Figure 13A:
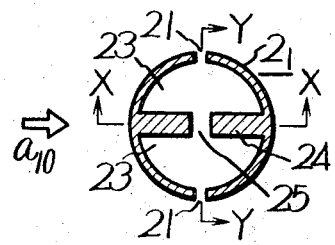
Figure 13B:
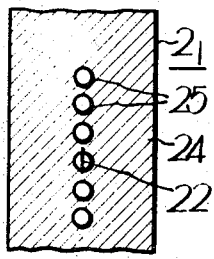
Figure 13C:
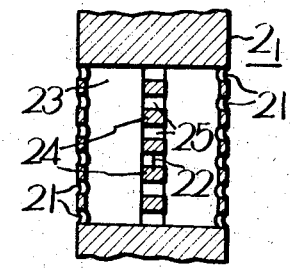

The example shown in FIG. 13 is the same in the provision of the cavity 23, the partition wall 24 and the holes 25 as in FIG. 12 except in that a plurality of bores 21 are formed in the cylindrical object $2_1$ while being arranged in its axis direction. The sensing element 22 is disposed in any one of the holes 25. It is possible to provide more than two sensing elements 22 in the holes 25.

Figure 14A:
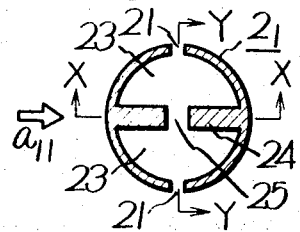
Figure 14B:
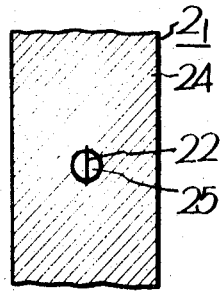
Figure 14C:
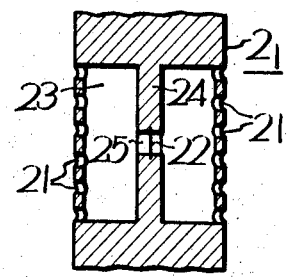

The example illustrated in FIG. 14 is the same in the formation of the plurality of bores 21, the cavity 23 and the partition wall 24 in the cylindrical object $2_1$ as in FIG. 13 except in that a single hole 25 is formed in the partition wall 24. The sensing element 22 is provided in the hole 25.

Figure 15A:
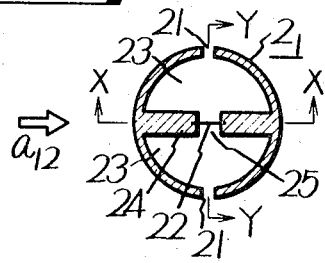
Figure 15B:
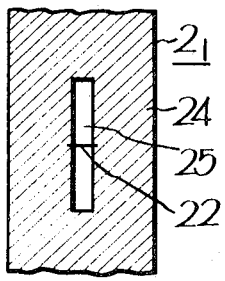
Figure 15C:
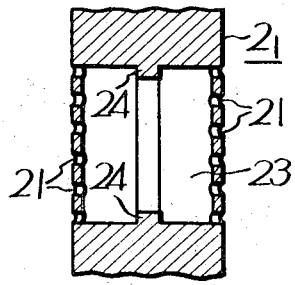

The example shown in FIG. 15 is the same in the provision of the cavity 23, the partition wall 24 and the bores 21 in the cylindrical object $2_1$ as in FIG. 14 except in that a slit 25 is formed in the partition wall 24 instead of the hole 25. The sensing element 22 is provided in the slit 25.

Figure 16A:
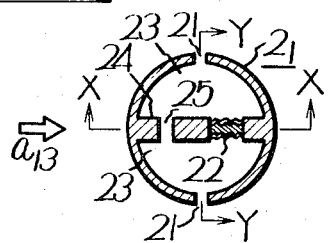
Figure 16B:
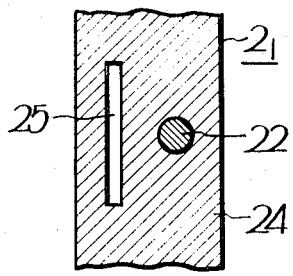
Figure 16C:
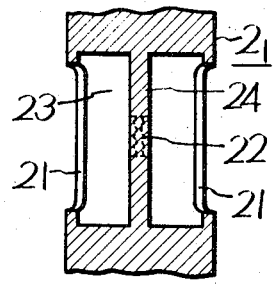

In the example depicted in FIG. 16 the bore 21 is formed in the cylindrical object $2_1$ in the shape of a slit having its inlet or outlet ports extending in its axial direction and the cavity 23 and the partition wall 24 are also provided as in the examples shown in FIGS. 11 and 12, a slit 25 is bored through the partition wall 24 at a place a little spaced from the central axis thereof in its axial direction, and a diaphragm serving as the sensing element 22 is disposed on the partition wall 24 on the opposite side from the slit 25. With such an arrangement, the fluid is displaced or flows in the passage defined by the bore 21, the cavity 23 and the slit 25 formed in the partition wall 24, and the diaphragm 22 detects the pressure difference between the two cavity rooms separated by the partition wall 24. The number of the pressure changes in the two cavity rooms is accurately proportional to the member of the displacements or flows of the fluid.

Figure 17A:
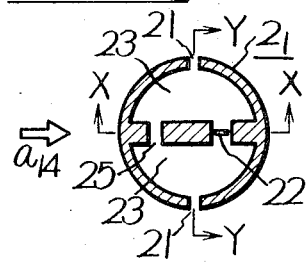
Figures 17B, 17C:
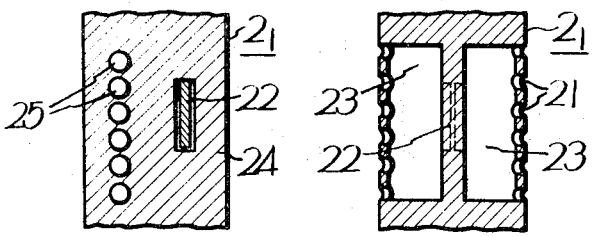

In the example illustrated in FIG. 17 a plurality of bores 21 are formed in the cylindrical object $2_1$ in such a manner that their inlet or outlet ports are arranged in the axial direction as in FIGS. 13 to 15 and a plurality of apertures 25 such as shown in FIGS. 12 and 13 are provided in thee partition wall 24 at the same place as the slit 25 in FIG. 16, and a planar object 22 having mounted thereon a sensing element, for example, a distorting element is attached to the partition wall 24 at the same place as the sensing element 22 in FIG. 16.

Figure 18:
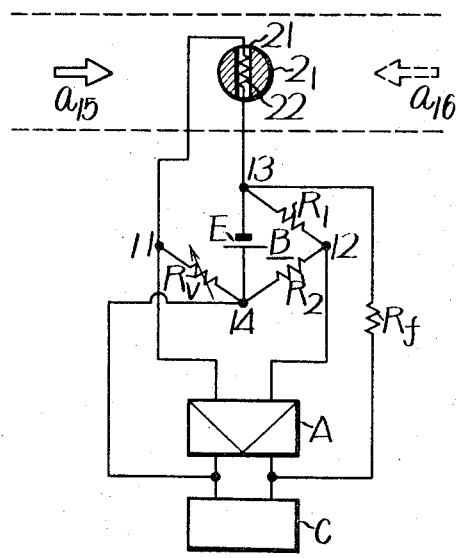
FIG. 18 is a connection diagram of one example of an instrument for electrically measuring the fluid flow velocity or flow rate through the use of the cylindrical object of this invention.

FIG. 18 is an electrical connection diagram illustrating one example of an electric circuit for measuring the flow velocity or flow rate through the use of the cylindrical object of this invention described above. In the figure reference numeral $2_1$ indicates generally such a cylindrical object of this invention as described above, 21 a transverse bore formed in the cylindrical object, and 22 the sensing element such, for example, as a hot wire disposed in the bore 21. Reference character B designates a bridge circuit consisting of the sensing element 22, resistors $R_1$ and $R_2$ and a variable resistor $R_v$ connected as illustrated, E a DC power source of the bridge circuit B, A an amplifier, C a counter and $R_f$ a feedback resistor.

In the above electric circuit one pair of terminals 11 and 12 of the bridge circuit B are connected to the input terminals of the amplifier A and the DC power source E is connected between the other pair of terminals 13 and 14 of the bridge circuit B. Further, the output terminals of the amplifier A are connected to the counter C and one of the output terminals of the amplifier A is connected through the feedback resistor $R_f$ to the terminal 13 of the bridge circuit B. An electrical resistance variation of the sensing element 22 caused in proportion to the number of the Karman vortices produced is detected by the bridge circuit B and is further amplified by the amplifier A. One portion of the output of the amplifier A is negatively fed back to the sensing element 22 through the feedback resistor $R_f$ and is indicated by the counter C. The negative feedback configuration works so that the temperature of the hot wire is kept constant.

In the illustrated example the bore 21 of the cylindrical object $2_1$ has a central angle $\theta$ of 90 degrees relative to the fluid flow direction (refer to FIG. 2), so that the flow velocity or flow rate of the fluid stream in both directions indicated by full-lined and broken-lined arrows $a_{15}$ and $a_{16}$ can be measured with the same circuit.

Figure 19A:
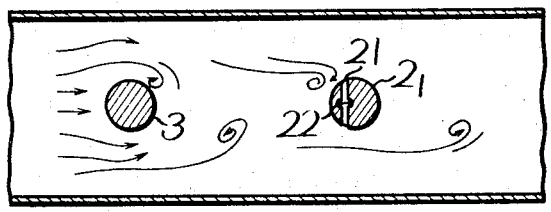
FIGS. 19, 20 and 21A are schematic diagrams showing other modifications of the device for producing the Karman vortex street.
Figure 19B:
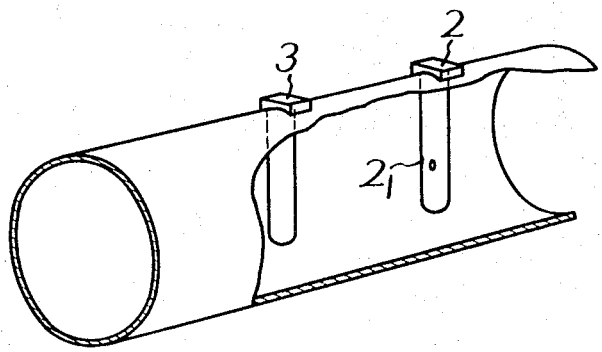

In FIG. 19 there is illustrated still another example of this invention, in which another cylindrical object 3 is placed upstream from cylindrical object $2_1$ for periodic and accurate formation of the Karman vortices. With such an arrangement, vortices produced by the cylindrical object 3 pass the opposite sides of the cylindrical object $2_1$ where the bore 21 opens out and variations in the fluid stream are detected by a sensing element 22 provided in the bore 21 of the cylindrical object $2_1$. This method provides for enhanced sensitivity in the detection of the variations of the fluid stream of low flow velocity. Further, it is possible to eliminate noise contained in the stream by making use of the interference between the vortices respectively produced by the upstream cylindrical object 3 and the downstream one $2_1$.

Figure 20:
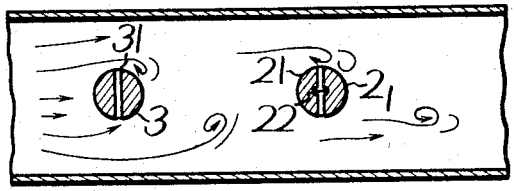

It is also possible to form a transverse bore 31 in the cylindrical object 3 placed in the upstream as shown in FIG. 20. In this case the bore 31 may be similar in construction to those previously described with the foregoing examples. The provision of the bore 31 ensures further stable formation of the vortices produced by the cylindrical object 3 located in the upstream of the fluid.

Figure 21A:
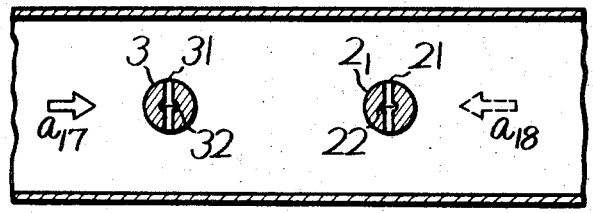
Figure 21B:
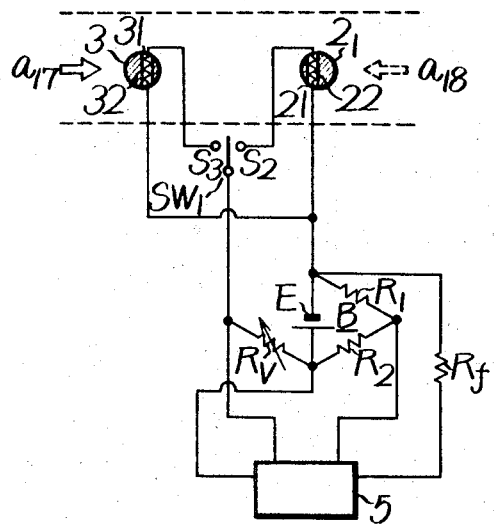
FIG. 21B is a connection diagram illustrating another example of the instrument for electrically measuring the fluid flow velocity or flow rate according to this invention.

Further, it is possible to dispose a sensing element 32 in the bore 31 of the cylindrical object 3 placed in the upstream as depicted in FIG. 21A. In this case the sensing elements 22 and 32 placed in the bores 21 and 31 of the two cylindrical objects $2_1$ and 3 are switchingly connected to such a bridge circuit B as shown in FIG. 18 through a switch SW as depicted in FIG. 21B in such a manner that when the fluid flows in a direction of a full-line arrow $a_{17}$ a moving contact $SW_1$ of the switch SW engages a fixed contact $S_2$ and when the fluid flows in a direction of a broken-line arrow $a_{18}$ the moving contact $SW_1$ engages a fixed contact $S_3$, thus measuring the fluid flow velocity or rate in either direction.

Figure 22A:
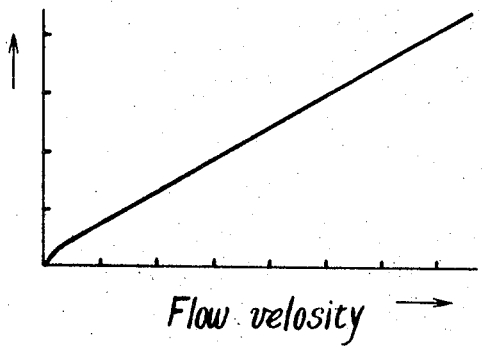
FIGS. 22A and 22B are graphs showing, by way of example, the measured values obtained with the measuring instrument of this invention.
Figure 22B:
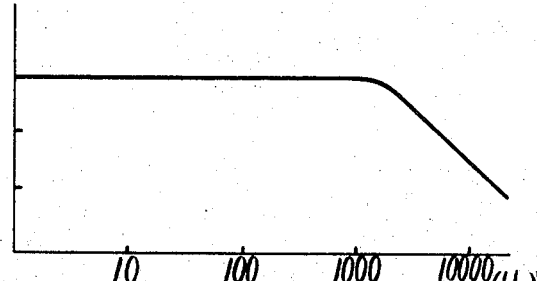

Figures 22A and 22B are graphs showing one example of measured values obtained in an experiment with the instrument exemplified in FIG. 21. In the experiment the diameter of the cylindrical objects $2_1$ and 3 was 20 mm. and the size of the slit-shaped openings of the bores 21 and 31 was 2 x 20 mm. and the sensing element was a hot wire, and the experiment was conducted in the water flow in a 2-inch pipe.

The graph of FIG. 22A shows the relationship between the fluid flow velocity and the corresponding output (in frequency), the abscissa representing the former and the ordinate the latter.

The graph of FIG. 22B shows the relationship between the frequency of the formation of the Karman vortices and the corresponding hot wire output signal amplitude (in voltage), the abscissa representing the former and the ordinate the latter.

Figure 23A:
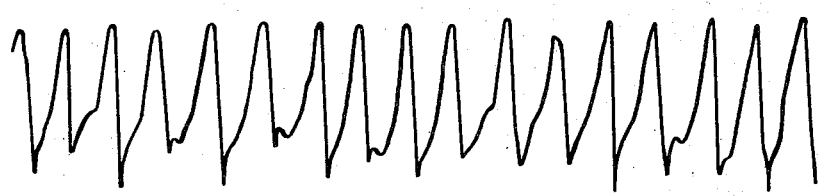
FIGS. 23A and 23B are output waveform diagrams showing, by way of example, the measured values obtained with the measuring instrument of this invention.

FIG. 23A illustrates an output waveform of the hot wire of the detection in FIG. 22 recorded by an electromagnetic oscillograph in the above experiment. It has been ascertained that the output waveform completely satisfies the relation given by the aforementioned Equation 1.

Figure 23B:

FIG. 23B shows an output waveform obtained in the case where a hot wire was placed down a mere cylindrical object in the water flow in the 2-inch pipe. Instability and irregularity are seen in the waveforms in FIG. 23B.

Figure 24:
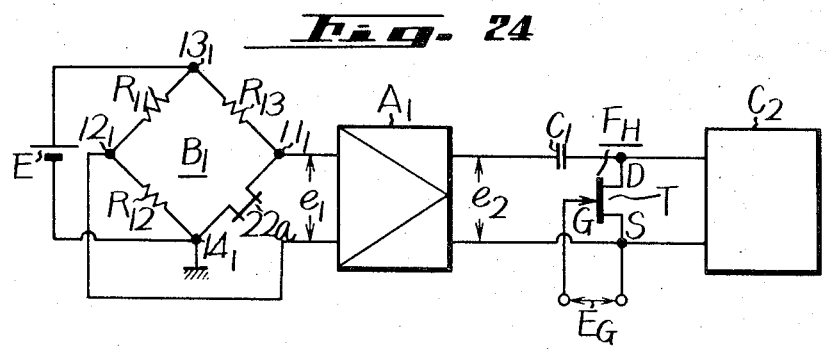
FIG. 24 is an electrical connection diagram illustrating another modified form of the measuring instrument of this invention.
Figure 25:
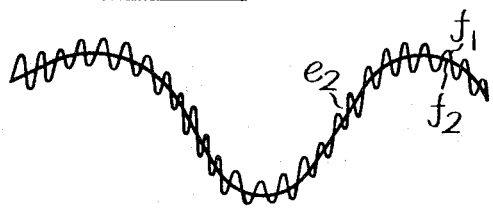
FIGS. 25, 26 and 27 are diagrams for explaining the operation of the instrument exemplified in FIG. 24.
Figure 26:
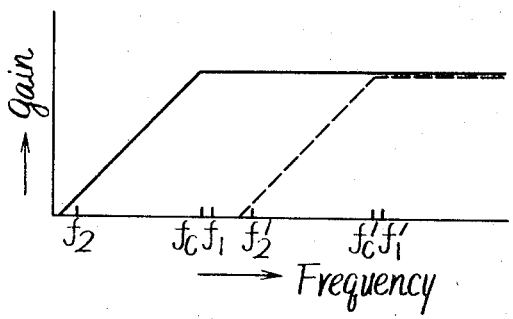
Figure 27:
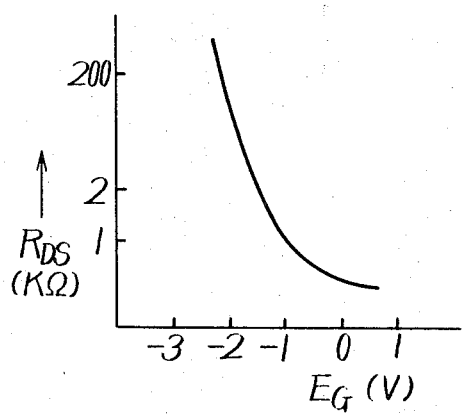

FIG. 24 is a connection diagram illustrating a further modified form of this invention, in which reference character $B_1$ indicates a bridge circuit consisting of resistance elements $R_{11}$, $R_{12}$ and $R_{13}$ and a sensing element $22_a$ such as, for example, the aforementioned hot wire connected in the illustrated manner, and reference character $E_1$ designates a DC power source. With the bridge circuit $B_1$, by the selection of the values of the resistance elements $R_{11}$, $R_{12}$ and $R_{13}$, a voltage $e_1$ whose frequency $f_1$ varies with the number of changes of the resistance values of the hot wire $22a$ can be obtained at a pair of diagonal points $11_1$ and $12_1$ of the bridge circuit $B_1$. The resulting voltage $e_1$ is amplified by an amplifier $A_1$ up to a voltage $e_2$ having a waveform such as shown in FIG. 25 that the component of the frequency $f_1$ and that of a frequency $f_2$ (described later) lower than $f_1$ are superimposed, and the frequency $f_2$ increases with an increase in $f_1$. The component of the frequency $f_2$ is the so-called fluctuation of the low frequency, which is considered to be caused by an object immersed in the fluid stream but its cause has not as yet been clarified satisfactorily. Reference character $F_H$ indicates a high-pass filter consisting of a capacitor $C_1$ and a field-effect transistor T. A resistance value $R_{DS}$ between the drain D and the source S of the field-effect transistor T relative to a voltage $E_G$ applied to the gate G increases with an increase in the negative value of the voltage fed to the gate as depicted in FIG. 27 when the transistor T is, for example, of N- channel junction type. In the case of P-channel junction type, the characteristics become opposite. Consequently, if the voltage $E_G$ is caused to vary with changes in the frequency $f_1$ (accordingly in the flow velocity of the fluid to be measured) and the pass band of the filter $F_H$ is caused to rise (corner frequency increases), that is, to shift the pass band from the full line to the broken line by selecting the polarity of the voltage $E_G$ to cause a decrease in the value of the resistance value $R_{DS}$ with an increase in the frequency $f_1$ (accordingly an increase in the flow velocity of the fluid), the component of the frequency $f_1$ excluding that of the frequency $f_2$ can be only applied to a counter circuit $C_2$. This prevents the counter circuit $C_2$ from operation due to the fluctuation of the low frequency $f_2$ and from failure to count the frequency $f_1$. The DC voltage $E_G$ varying with the fluid flow velocity may be produced by taking advantage of the variation of the DC component of the output voltage $e_2$ of the amplifier $A_1$ with the fluid flow velocity (the mean value of the resistance value of the hot wire 22a varies with the fluid flow velocity, so that the voltage $e_2$ includes the DC component varying with the flow velocity) or by the use of the counter circuit $C_2$ to produce a DC voltage corresponding to its counted pulse rate.

Figure 28:
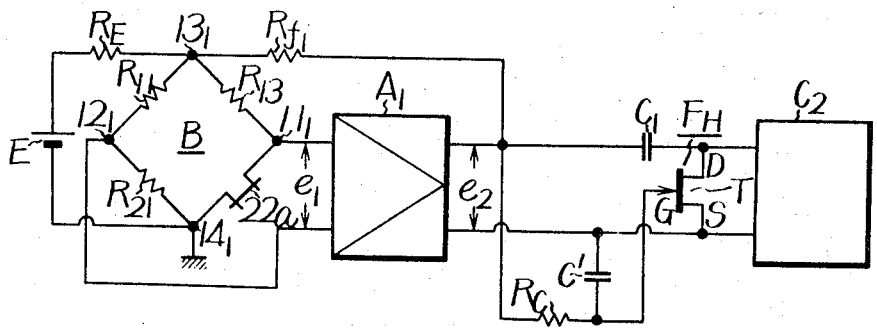
FIG. 28 is a similar electrical connection diagram showing still another modification of the measuring instrument of this invention.

FIG. 28 is a connection diagram showing still a further example of this invention. This example is substantially the same in construction as in FIG. 24 except in that one portion of the output of the amplifier $A_1$ is negatively fed back to a bridge circuit $B_1$ through a feedback resistance element $Rf_1$ and in that the DC component of the output of the amplifier $A_1$ is fed to the gate G of the field-effect transistor T through a low-pass filter consisting of a resistance element $Rc$ and a capacitor $C'$. In the present example the output of the amplifier $A_1$ is negatively fed back to the bridge circuit $B_1$, so that the mean temperature of the hot wire 22a is held constant to cause a further decrease in the fluctuation of the low frequency $f_2$.

Although some of the foregoing examples employ the hot wire as the detector for detecting the number of vortices produced, the hot wire may be replaced with a combination of an elastic member such, for example, as a diaphragm with a strain gauge or vibratory piece vibrating with the fluid stream. The high-pass filter having the field-effect transistor may be replaced with or used with a low-pass filter or a band-pass filter having a field-effect transistor depending upon the relationship between the signal component and the noise component. Further, the frequency is counted by the counter circuit but it may be measured by converting the frequency into analog form such as, for example, in the form of current or voltage. In short, the circuit may be any circuit with which the frequency can be measured.

In the examples of FIGS. 24 and 28 the noise frequency component varying with the flow velocity or flow rate of the fluid to be measured is removed by the filter whose frequency pass band is automatically changed in relation to the variation in the fluid flow velocity or flow rate, so that accurate flow velocity or flow rate measuring instrument can be provided in simple construction.

In FIGS. 18, 21, 24 and 28 the description has been given of the means for electrically measuring the fluid flow velocity or flow rate by detecting the number of vortices produced by the Karman vortex generating means of this invention. However, when the diaphragm is used as the sensing element, it is also possible to measure the fluid flow velocity or flow rate by detecting the vibration of the diaphragm in the form of a resistance variation with a strain gauge attached to the diaphragm or by converting the vibration of the diaphragm into an electric signal in the form of an electrostatic capacity change or electromagnetic change or by directly detecting the vibration of the diaphragm.

As has been described above, in the present invention the interconnecting outlet or inlet ports are formed in the object for producing the Karman vortex street in a manner to open out in the vicinity of the places where the boundary layers of the fluid are separated from the object and the sensing element for detecting the displacement or flow velocity of the fluid stream in the bore is disposed in the bore, by which the vortices formed on the opposite sides of the object are made stable irrespective of the fluctuation of the fluid stream or eddies other than the Karman vortices to ensure that a signal accurately proportional to the flow velocity or flow rate of the fluid to be measured can be obtained from the sensing element. Further, when the bore having outlet or inlet ports is formed in the shape of a slit extending in the axial direction of the object or a plurality of bores are formed in a manner to open out in alignment in the axial direction of the object, the separation conditions of the boundary layers are rendered uniform in the axial direction of the object to ensure further stable formation of the vortices on the opposite sides of the object and to remarkedly improve the S/N ratio. In addition, since the sensing element detects the displacement of the fluid in the transverse bore or the number of changes of the fluid flow velocity, change of static characteristics of the sensing element do not matter.

Although the present invention has been described in connection with examples employing a cylindrical object for producing the Karman vortices, the reference to the cylindrical object should not be construed as limiting the invention specifically thereto and an object of, for example, oval or quadrilateral cross section can be used, in which case a transverse bore is made in the object as usual.

It will be apparent that many modifications and variations may be effected without departing from the scope of the novel concepts of this invention.

We claim as our invention:

1. A current meter or flow meter comprising a rod-shaped object for producing Karman vortices, having bored therethrough a transverse bore, said rod-shaped object being immersed in a fluid stream, a portion of said fluid stream capable of passing through said transverse bore and the ports of said transverse bore being opened in the vicinity of separation points of the boundary layers of said fluid from said rod-shaped object so that the fluid at the ports which passes through the transverse bore controls the condition of the formation of the Karman vortices, a sensing element disposed in the transverse bore for detecting the number of reversals of the fluid through the transverse bore, and a counter means for measuring the output from said sensing element to determine velocity of said fluid stream, whereby influence caused by fluctuations of the fluid stream can be positively eliminated.

2. A current meter or flow meter as claimed in claim 1 wherein the transverse bore is formed in the cylindrical object in such a manner that the ports of the transverse bore open out on the opposite sides of the cylindrical object with their central angles being in a range from 65° to 110° relative to the plane containing the upstream flow direction line and the axis of the rod-shaped object.

3. A current meter or flow meter as claimed in claim 1 wherein the transverse bore is provided in the form of a slit extending in the axial direction of the rod-shaped object.

4. A current meter or flow meter as claimed in claim 1 comprising a plurality of transverse bores formed in the rod-shaped object parallel to said transverse bores in such a manner that their ports are aligned in the axial direction of the rod-shaped object.

5. A current meter or flow meter as claimed in claim 3 wherein the ports of the slit-shaped transverse bore are intercommunicated through a cavity formed in the rod-shaped object and at least one hole bored through a partition wall formed in the cavity of the rod-shaped object, the sensing element being disposed in the hole of the partition wall.

6. A current meter or flow meter as claimed in claim 4 wherein a cavity is provided in the rod-shaped object which has a partition wall having formed therethrough at least one of said transverse bores, the sensing element being mounted in a hole formed in the partition wall.

7. A current meter or flow meter as claimed in claim 5 wherein the sensing element is a pressure sensing element mounted on the partition wall at one place.

8. A current meter or flow meter as claimed in claim 6 wherein the sensing element is a pressure sensing element mounted on the partition wall at one place.

9. A current meter or flow meter as claimed in claim 1 which comprises another rod-shaped object located upstream with respect to the first mentioned rod-shaped object for producing further Karman vortices about the first mentioned rod-shaped object.

10. A current meter or flow meter as claimed in claim 9 wherein said another rod-shaped object is cylindrical.

11. A current meter or flow meter as claimed in claim 9 wherein said another rod-shaped object has formed therethrough a transverse bore similar to that of the first-mentioned rod-shaped object.

12. A current meter or flow meter as claimed in claim 10 wherein said another cylindrical object has formed therethrough a transverse bore similar to that of the first mentioned rod-shaped object.

13. A current meter or flow meter as claimed in claim 12 wherein the ports of the transverse bore formed in said another rod-shaped object are arranged in a range of 65° to 110° relative to the plane containing the upstream flow direction line and the axis of the cylindrical object.

14. A current meter or flow meter as claimed in claim 11 wherein the transverse bore formed in said another rod-shaped object is slit-shaped.

15. A current meter or flow meter as claimed in claim 12 wherein the transverse bore formed in said another cylindrical object is slit-shaped.

16. A current meter or flow meter as claimed in claim 11 wherein the transverse bore formed in said another rod-shaped object is in the form of a plurality of bores, the axial direction of each bore being aligned along the axial direction of said another rod-shaped object.

17. A current meter or flow meter as claimed in claim 12 wherein the transverse bore formed in said another cylindrical object is in the form of a plurality of bores, the axial direction of each bore being aligned along the axial direction of said cylindrical object.

18. A current meter or flow meter as claimed in claim 14 wherein the ports of the transverse bore of said another rod-shaped object intercommunicate through a cavity formed in said another rod-shaped object and a partition wall having formed therein at least one hole is disposed in the cavity for dividing the cavity into two portions, whereby the ports of said transverse bore of said another rod-shaped object intercommunicate through said cavity and hole formed in the partition wall.

19. A current meter or flow meter as claimed in claim 15 wherein the ports of the transverse bore of said another rod-shaped object intercommunicate through a cavity formed in said another cylindrical object and a partition wall having formed therein at least one hole is mounted in the cavity for dividing the cavity into two portions, whereby the ports of said transverse bore of said another rod-shaped object are intercommunicated through said cavity and hole formed in the partition wall.

20. A current meter or flow meter as claimed in claim 16 wherein the ports of the plurality of transverse bores of said another rod-shaped object intercommunicate through a cavity formed in said another rod-shaped object and a partition wall having formed therein at least one hole is mounted in the cavity for dividing the cavity into two portions, whereby the ports of said transverse bore of said another rod-shaped object intercommunicate through said cavity and hole formed in the partition wall.

21. A current meter or flow meter as claimed in claim 17 wherein the ports of said plurality of transverse bores of said cylindrical object intercommunicate through a cavity formed in said another cylindrical object and a partition wall having formed therein at least one hole is mounted in the cavity for dividing the cavity into two portions, whereby the ports of said transverse bore of said another rod-shaped object intercommunicate through said cavity and hole formed in the partition wall.

22. A current meter or flow meter as claimed in claim 1 wherein an amplifier is provided for amplifying an output signal of the sensing element disposed in the transverse bore, and a means is provided for negatively feeding back the output signal of the amplifier to the sensing element.

23. A current meter or flow meter as claimed in claim 1 wherein a filter circuit is connected between the sensing element and the counter means, said filter circuit being automatically varied in its frequency pass-band corresponding to the variation of the speed or flow of the fluid and capable of eliminating noise components changing in correspondence with the change of the speed or flow contained in the output signal from said sensing element.

References Cited

UNITED STATES PATENTS

| | | | |
|---|---|---|---|
| 1,935,445 | 11/1933 | Heinz | 73—194(Vib.) |
| 2,813,424 | 11/1957 | Liepmann et al. | 73—194(Vib.) |
| 2,869,366 | 1/1959 | Nitikman | 73—194(Vib.) |
| 3,116,639 | 1/1964 | Bird | 73—194(Vib.) |

FOREIGN PATENTS

| | | | |
|---|---|---|---|
| 150,656 | 12/1962 | Russia | 73—194 (Vib.) |

OTHER REFERENCES

"Fluid Amplifier Measures Flow Velocity," SDS Data Systems technical release—published in Control Engineering, p. 103, January, 1966; J. T. Sharpsteen—author.

RICHARD C. QUEISSER, Primary Examiner

M. SMOLLAR, Assistant Examiner